Figure 1:
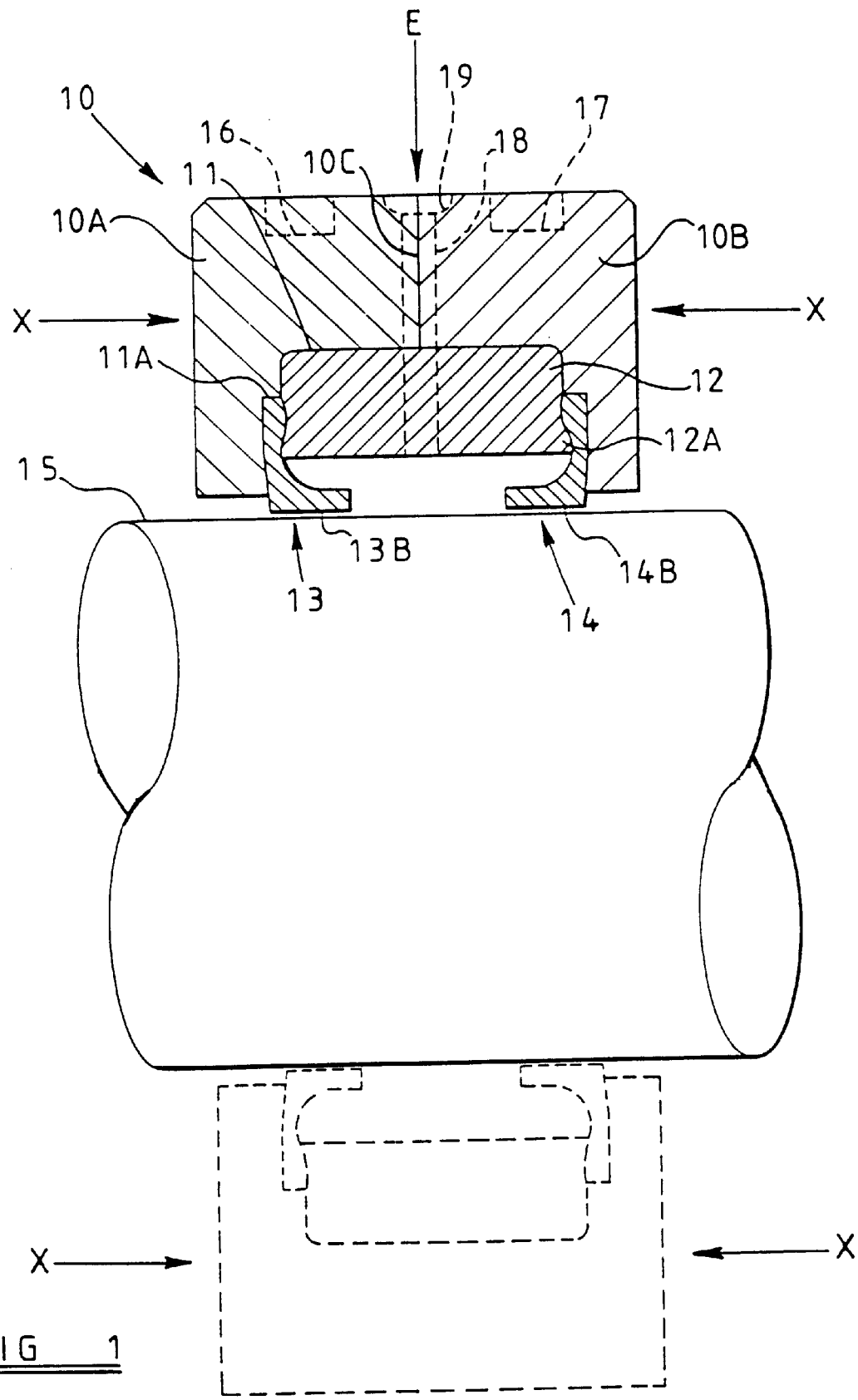

United States Patent [19]

Broadbent

[11] Patent Number: 5,957,460
[45] Date of Patent: Sep. 28, 1999

[54] METHOD OF ASSEMBLING A SEALING MEMBER INTO A HOUSING AND A SEAL ASSEMBLY MADE THEREBY

[75] Inventor: Roland James Broadbent, Banbury, United Kingdom

[73] Assignee: Prodrive Holdings Ltd., Banbury, United Kingdom

[21] Appl. No.: 08/930,035

[22] PCT Filed: Mar. 27, 1996

[86] PCT No.: PCT/GB96/00731

§ 371 Date: Sep. 26, 1997

§ 102(e) Date: Sep. 26, 1997

[87] PCT Pub. No.: WO96/30678

PCT Pub. Date: Oct. 3, 1996

[30] Foreign Application Priority Data

Mar. 28, 1995 [GB]  United Kingdom ................... 9506265

[51] Int. Cl.$^6$ .................................................. F16J 15/32
[52] U.S. Cl. ......................... 277/565; 29/463; 219/121.14
[58] Field of Search .................................. 277/564, 565, 277/370, 549, 551, 557, 558, 562, 563, 567, 572, 575, 922; 219/121.14; 29/463, 888.012, 888.3, DIG. 13, DIG. 48; 285/288.1, 288.2

[56] References Cited

U.S. PATENT DOCUMENTS 2,872,229  2/1959  Waser ....................................... 277/564
3,058,861  10/1962  Rutter ..................................... 29/463 X
3,871,666  3/1975  Franz et al. .............................. 277/563
4,639,571  1/1987  Lewandowski et al. ...... 219/121.14 X
4,706,970  11/1987  Ramirez ............................... 277/565 X

FOREIGN PATENT DOCUMENTS 0599533  6/1994  European Pat. Off. .
2666531  3/1992  France .
538318  7/1941  United Kingdom .

OTHER PUBLICATIONS

Kanji Katada; Welding Method of Hollow Shaft; Jan. 21, 1986; vol. 10, No. 14.

Primary Examiner—Lynne Reichard
Assistant Examiner—Greg Binda
Attorney, Agent, or Firm—Oppenheimer Wolff & Donnelly LLP

[57] ABSTRACT

A seal assembly is provided intended to locate sealing means (13, 14) between a housing (10, 11) and another member (15) which may be fixed or rotating. A housing for the sealing member is formed of two parts (10, 11) between which the sealing member is to be located. A first housing part (10) may be in two portions arranged to be fitted together. A second housing part (11) is located between the two portions of the first housing part (10) and a seal (13, 14) is located between the two housing parts. The assembly is secured together by welding the two portions (10A, 10B) of the first housing part.

9 Claims, 2 Drawing Sheets

METHOD OF ASSEMBLING A SEALING MEMBER INTO A HOUSING AND A SEAL ASSEMBLY MADE THEREBY

This invention relates to seal assemblies and, in particular, to assemblies in which hydraulic sealing means is fixedly located so that, in use, the sealing means seals between a housing on which the seal is located and another member which may be fixed or rotating.

Especially under high pressures and when a seal is to be located against a rotating member, problems have been encountered in locating the seal in a housing so that the seal is securely fixed while still able to perform its sealing function, and in a manner which is relatively easy to assemble and is cost effective. For example, it has been proposed to locate a seal between two elements which are clamped together by fastening means in the form of bolts or the like.

An object of the present invention is to provide an improved seal assembly which overcomes disadvantages of existing arrangements.

According to one aspect of the invention there is provided a method of assembling a sealing member into a housing, the housing comprising a first and a second housing part between which parts the sealing member is to be located, the method including locating the second housing part interfitting with the first housing part with the sealing member located therebetween, maintaining the parts together, and welding the housing parts together at a position spaced from the sealing member, whereby to secure the housing parts together with the seal in a fixed position between the housing parts, without the seal becoming degraded by heat from the welding action.

The first housing part may be formed in two portions arranged to be fitted together, the second housing part being located between the two portions of the first housing part and the two portions of the first housing part being welded together.

Preferably the welding action is by the use of electron beam welding apparatus.

Conveniently the housing parts or a housing part is thermally linked to a heat sink during the welding action to abstract heat from the housing parts.

The seal may be of PTFE or other material which is normally affected by being heated above a predetermined temperature.

Preferably the seal assembly is for use in sealing a fixed member relative to a rotating member against passage of pressurised hydraulic fluid, the fluid pressure being relatively high, up to more than 100 bar and the rotating member rotating at up to, say, 10,000 rpm.

The invention also provides a seal assembly made according to the method of the invention, comprising a first housing part, a second housing part located to fit with the first housing part, and a sealing member located between the first and second housing parts to be gripped by said housing parts, the housing parts being welded together where they interfit.

The first housing part may be formed of two interfitting portions and the second housing part is located between the two portions of the first housing part.

The seal assembly may be of generally annular shape having the seal located at the radially inner side thereof whereby the seal is engageable with a rotatable member situated within the assembly.

In one arrangement two spaced seals are provided between which extends a duct for hydraulic fluid. When an annular assembly is provided the duct is arranged to extend radially through the assembly between the seals.

Figure 2:
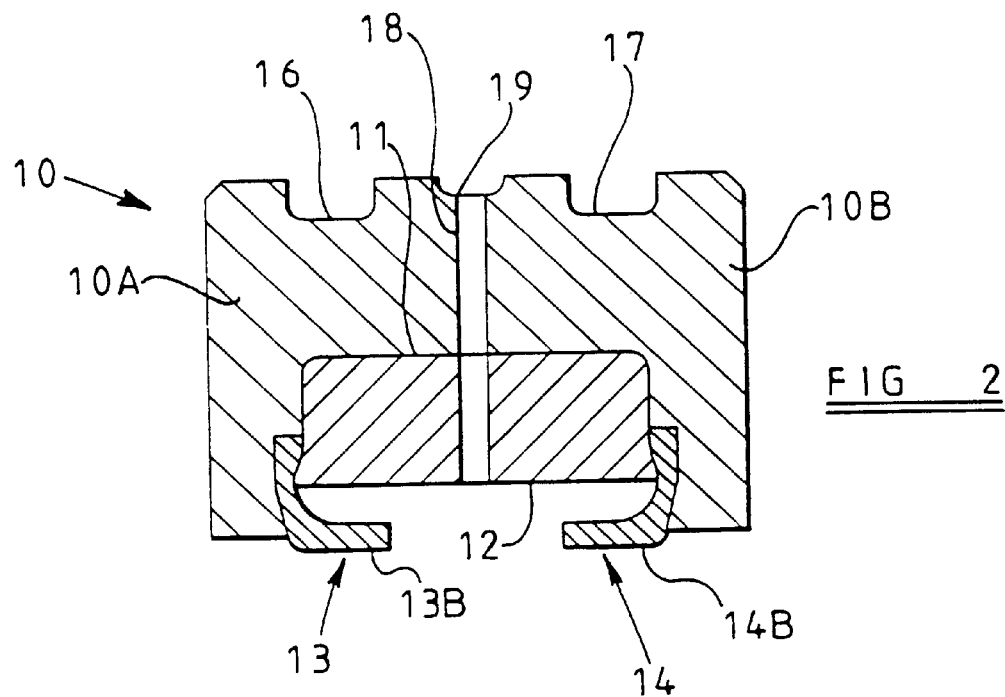
Figure 3:
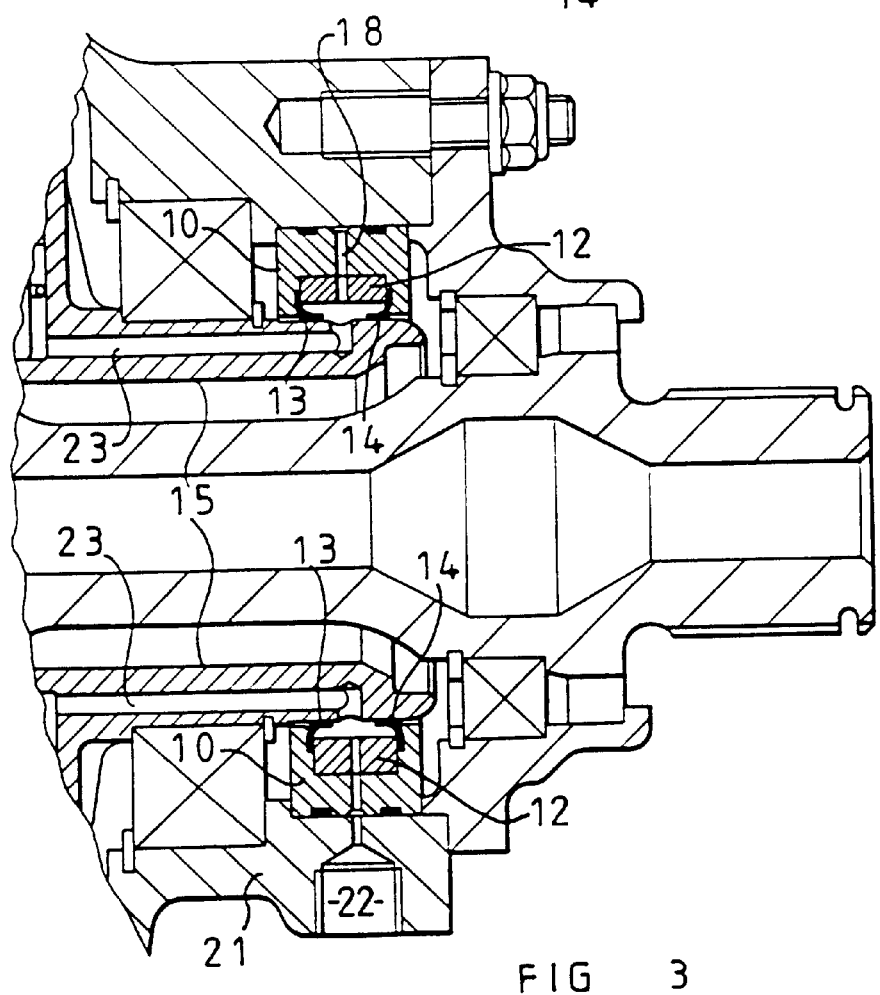

Further features of the invention will appear from the following description of an embodiment of the invention given by way of example only and with reference to the drawings in which:

FIG. 1 is a cross-section through a first seal assembly according to the invention, FIG. 2 is a cross-section through the finished seal assembly of FIG. 1, FIG. 3 is a sectional view through part of a differential in which the seal assembly of FIG. 2 is located.

Referring to the drawings and firstly to FIGS. 1–3 the seal assembly of the invention comprises a first or outer housing part 10 which is of generally annular shape and is formed from two portions 10A and 10B which fit together along a line 10C, the join line 10C extending in a radial plane around the housing 10.

At the radially inner side of the housing part 10 is formed a stepped channel 11 in which is locatable a second housing part 12 of generally rectangular cross-section, and a pair of seals 13 and 14 usually of PTFE or other suitable sealing material.

It will be seen that when the seal assembly has been assembled the housing part 12 is located at the base of the channel 11 and the seals 13 and 14 are located each between the housing part 12 and the respective portions 10A and 10B of the housing part 10. To ensure that the seals 13 and 14 are fixed in the assembled housing the radially inner side of the housing part 12 is flared at 12A to grip the radially outer edges of the seals 13 and 14, the inner edges of the seals being located against a shoulder 11A of the channel 11.

As shown the seals 13 and 14 are of generally L-shape whereby the limbs of the L which extend in the axial direction protrude radially inwards from the housing 10 and provide sealing surfaces 13B and 14B engageable with a rotatable member 15 around which the housing is located. In use the seals 13 and 14 seal the housing relative to the rotatable member 15.

In assembling the housing, the housing parts 10 and 12 and the seals 13 and 14 are assembled as shown in FIG. 1. Clamping pressure is then applied in the direction of arrows X to the assembly. The assembled components are then secured together by an electron beam welding apparatus which is applied in the direction of arrow E to weld the portions 10A and 10B of the housing parts 10 together along the line 10C. Usually the component will be mounted for rotation about its axis, the electron beam welding apparatus being in a fixed position so that the component is rotated past the welding apparatus.

The welding operation should be conducted as rapidly as possible for an effective securing together of the parts 10A and 10B with a minimum amount of heat dissipation into the housing part 10.

To improve the dissipation of heat during the welding process a heat sink component may be applied to the outer side or sides of the housing part 10 whereby heat is dissipated from the part 10 into the heat sink part or parts by thermal conduction, the heat sink component being thermally coupled to the part 10.

In this way it has been found that, provided the seals 13 and 14 are spaced from the point of action of the electron beam welding apparatus the seals 13 and 14 are not degraded by the heat generated during the welding process and the seals 13 and 14 are able to fulfil their function in sealing under high pressure conditions when the rotatable member 15 is rotating at high speed.

After the portions 10A and 10B of the housing part 10 have been welded together the housing part 10 can be machined further by providing grooves 16 and 17 for receiving further sealing means, by providing radial ducts 18 extending through the housing parts 10 and 11, and by providing a circumferential groove 19 in the housing part 10, all as shown in FIG. 2. Other machining requirements can also be provided at this stage, if required.

The seal assembly of FIGS. 1 and 2 may find application in a differential, part of which is shown in FIG. 3. In the arrangement of FIG. 3 the seal assembly is located between a fixed member 21 and a rotating member 15 high pressure fluid being directed from an inlet 22 in fixed member 21 through the ducts 18 and thence along an axial duct 23 in the rotating member 15. In practice the fluid pressure may be more than 100 bar and the rotating member 15 may rotate at up to 7–9000 rpm so that the seals 13 and 14 have a duty to effect a seal at high pressures and at high rotational speeds.

I claim:

1. A method of assembling a sealing member into a housing, the housing comprising first and second housing parts, the first housing part being formed in two portions arranged to be fitted together and the sealing member being for sealing against a rotating surface, the method including, locating the second housing part interfitting between the two portions of the first housing part, locating the sealing member between the first housing part and the second housing part, fitting the two portions of the first housing part together around the second housing part, clamping the two portions of the first housing part together so that the second housing part is held thereby and the sealing member is gripped between the first and second housing parts, maintaining the housing parts together, and welding together the two portions of the first housing part at a position spaced from the sealing member.

2. A method according to claim 1 wherein the welding together is performed by electron beam welding apparatus.

3. A method according to claim 1 wherein a heat sink is thermally linked to the first housing part during welding to abstract heat from the housing part.

4. A method according to claim 1 wherein the second housing part locates in a channel defined by the first housing part.

5. A method according to claim 1 wherein the second housing part is outwardly flared to engage and grip the sealing member.

6. A seal assembly, made according to the method of claim 1, comprising a first housing part formed of two interfitting portions, a second housing part clamped between the two portions of the first housing part so as to be held thereby, and a sealing member for sealing agaist a rotating surface, the sealing member being located between the first and second housing parts to be gripped by said housing parts, wherein the two portions of the first housing part are welded together at a position spaced from the sealing member.

7. A seal assembly according to claim 6 wherein said surface is located on a rotatable member arranged to rotate relative to the seal assembly, and the sealing member comprises two sealing elements sealing agaist said rotatable member.

8. A seal assembly according to claim 6 wherein the first housing part includes a duct for pressure fluid, which duct communicates with the sealing member.

9. A seal assembly according to claim 6 wherein the first and second housing parts are each in the form of annular members and the sealing member extends around the housing parts and is directed radially inwardly of the housing parts, wherein the sealing member is arranged to seal against the surface which extends coaxially of the housing parts.

* * * * *